United States Patent [19]

Edwards et al.

[11] Patent Number: 5,013,331
[45] Date of Patent: May 7, 1991

[54] PERMEATOR WITH SELECTABLE FLOW RATES

[75] Inventors: Donald W. Edwards, Wilmington; Billy J. Etienne, Newark, both of Del.

[73] Assignee: E. I. du Pont de Nemours and Company, Wilmington, Del.

[21] Appl. No.: 374,203

[22] Filed: Jun. 30, 1989

[51] Int. Cl.[5] .................. B01D 53/22; B01D 63/04
[52] U.S. Cl. .......................... 55/16; 55/21; 55/158
[58] Field of Search .............. 55/16, 18, 21, 158; 210/500.23

[56] References Cited

U.S. PATENT DOCUMENTS

| | | | |
|---|---|---|---|
| 3,801,401 | 4/1974 | Cope et al. | 156/172 |
| 3,884,814 | 5/1975 | Vogt et al. | 210/321 |
| 3,930,814 | 1/1976 | Gessner | 55/16 |
| 3,953,334 | 4/1976 | Brun et al. | 210/321 |
| 4,038,190 | 7/1977 | Baudet et al. | 210/321 B |
| 4,207,192 | 6/1980 | Coplan et al. | 55/158 X |
| 4,397,661 | 8/1983 | King et al. | 55/158 |
| 4,508,548 | 4/1985 | Manatt | 55/16 X |
| 4,537,606 | 8/1985 | Itoh et al. | 55/158 |
| 4,556,180 | 12/1985 | Manatt | 55/158 X |
| 4,666,469 | 5/1987 | Krueger et al. | 55/16 |
| 4,676,808 | 6/1987 | Coplan | 55/16 X |
| 4,681,602 | 7/1987 | Glenn et al. | 55/16 X |
| 4,707,267 | 11/1987 | Johnson | 55/16 X |
| 4,732,673 | 3/1988 | Dagard et al. | 55/158 X |
| 4,746,430 | 5/1988 | Cooley | 55/158 X |
| 4,752,305 | 6/1988 | Johnson | 55/16 |
| 4,789,388 | 12/1988 | Nishibata et al. | 55/158 |
| 4,806,132 | 2/1989 | Campbell | 55/16 |
| 4,871,379 | 10/1989 | Edwards | 55/158 |

FOREIGN PATENT DOCUMENTS

| | | | |
|---|---|---|---|
| 0051469 | 5/1982 | European Pat. Off. | 55/16 |
| 0075431 | 3/1983 | European Pat. Off. | 55/16 |

Primary Examiner—Robert Spitzer
Attorney, Agent, or Firm—Craig H. Evans

[57] ABSTRACT

A permeable membrane apparatus having one or more hollow-fiber bundles enclosed in a single housing with end caps adapted so as to segment the bundles into a plurality of portions that can be separately used for fluid separation and its use.

26 Claims, 11 Drawing Sheets

VIEW A-A

FIG. 11

VIEW B-B

PERMEATOR WITH SELECTABLE FLOW RATES

FIELD OF INVENTION

This invention relates to a permeable membrane apparatus having hollow-fiber bundle portions which can be selected to provide various fluid flow rates.

BACKGROUND OF THE INVENTION

Permeable hollow-fiber membrane processes and systems are being employed or considered for a wide variety of fluid (gas and liquid) separations. In such operations, a feed stream is brought into contact with the surface of the membrane; a pressure differential is maintained across the membrane; the more readily permeable component of the feed stream passes through the membrane and is withdrawn as the permeate stream; and the less readily permeable component does not pass through the membrane and is withdrawn as a non-permeate, or retentate, stream.

The membrane material and form employed may be any suitable material capable of effecting the desired separation. For example, cellulose derivatives, polyamides, polyimides, polysulfones, and polystyrenes have found utility. Also for example, hollow-fiber membranes may be composite, asymmetric, or dense film.

The membrane is generally supported and sealed in a housing such as a shell or vessel to form a permeator. The housing contains the fluids, protects the membrane, and channels and separates the flow of the permeate and retentate. Particularly in the case of membranes comprising hollow fibers, the art has taught that more than one bundle of hollow fibers can be included in a single housing. Such an arrangement reduces weight and cost of the system.

U.S. Pat. No. 3,884,814 describes a hollow fiber permeator having two "U" shaped bundles on a cruciform core in a single housing. A lid equipped with an inlet and an outlet for each of the "U" shaped bundles permits feeding the bundles separately. The reference suggests ultrafiltration of different solutions in each bundle.

U.S. Pat. No. 3,953,334 teaches a plurality of separate bundles of hollow cords separately supported and sealed in side plates connected to a central conduit and support within a single shell. Flange members provide common fluid communication between the ends of the cord bundles and the outside of the shell.

A permeator is generally designed to provide a given product quality (separation) at a single flow rate (flux). U.S. Pat. No. 4,806,132 claims a method of achieving turndown control in a permeator system at reduced flow demand. The background of that patent suggests without any detail that turndown can be achieved in other systems by shutting down a portion of the membrane area in the system under reduced demand conditions.

U.S. Pat. No. 4,397,661 employs a plurality of permeators manifolded in a manner that permits shutting down a portion of the total area of membrane in the system under reduced demand conditions by valving one or more permeators out of the system.

U.S. Pat. No. 4,537,606 teaches a method of varying oxygen flow and concentration for combustion by varying total membrane area by valving in auxiliary membrane cells manifolded with the primary cell.

One use for permeators described in U.S. Pat. No. 4,556,180, which is incorporated herein by reference, is inerting of fuel tanks on airplanes to eliminate explosive gas mixtures that are a hazard in case of lightning strikes, crash damage or military damage. Particularly in situations where feed air is at a low pressure such as on helicopters, an alternate system employing one or more air separation modules is taught.

U.S. Pat. No. 4,556,180 does not provide a means for varying flow from the permeator based on demand as is particularly needed in airplane operation. For example, during level flight, a relatively low rate of nitrogen-enriched-air (NEA) flow is required to take the place of fuel being used. During a dive from high altitude, however, a higher rate of NEA flow is required to keep the internal pressure in the fuel tanks equal to the external pressure. If the fuel tanks are nearly empty during a dive, an even higher rate of NEA flow may be required.

Manifolding permeators such as in U.S. Pat. No. 4,397,661 would enable varying flow while maintaining NEA with the percent oxygen in the gas at less than 9 percent. But a hollow-fiber permeator system needed to accommodate the various flow needs noted above would require at least two separate permeators which are heavy and bulky and therefore are a problem on an aircraft with weight and space limitations.

Simply operating a single conventional permeator at the several different flow rates needed is not desirable for the following reasons: when operating a high flow capacity permeator at lower flow rates, the velocity of gas through the hollow fibers is so low that the recovery (ratio of NEA flow to feed flow) of the permeator drops to an inefficient level; and when operating a low flow capacity permeator at higher flow rates, the purity of the NEA drops to an undesirably low value (percent oxygen greater than 9%).

SUMMARY OF THE INVENTION

The permeator of the invention allows variation in flow without an unacceptable increase in oxygen in the NEA and solves the problem of space and weight. The invention does so by adapting the enclosing means, which includes end caps or lids individually or in an assembly with other parts, on a single housing, preferably a cylindrical pressure vessel, to divide one or more hollow-fiber bundles into a plurality of portions, the bundle portions being arranged in a housing equipped with a means for allowing each bundle portion to be fed with separate feed and equipped with a means to remove the retentate from that bundle portion. The permeate flow paths are directed to a common outlet port.

A preferred geometric arrangement for the bundle portions is to position one or more portions concentric with each other in a single housing. In a concentric configuration, two or more bundles having appropriate inner and outer diameters can be nested together or a single bundle as a monolithic structure can be used. This simplifies fabrication of the bundles and alignment of the parts within the housing. The design provides economies in fabrication and parts costs compared to devices housing a plurality of bundles not concentric with each other or, when used in a system, as compared to manifolded permeators to produce multiple flow rates. It provides a smaller more efficient permeator than one where the flow rate is varied through a single bundle or where more than one bundle is inserted into a single shell in a non-concentric manner.

By providing a means of regulating the feed to inlet ports of the separate portions of a multiportion permeator and a means for regulating the retentate from outlet ports of the same sections, multiple flow rates can be achieved. With a permeator having two concentric sections, for example, three different flow rates can be achieved. This same arrangement can also produce two different retentate streams when the selectivity of the membranes in each bundle portion is different.

DETAILED DESCRIPTION OF THE ILLUSTRATED EMBODIMENTS CONCENTRIC PERMEATOR STRUCTURE

Figure 1:
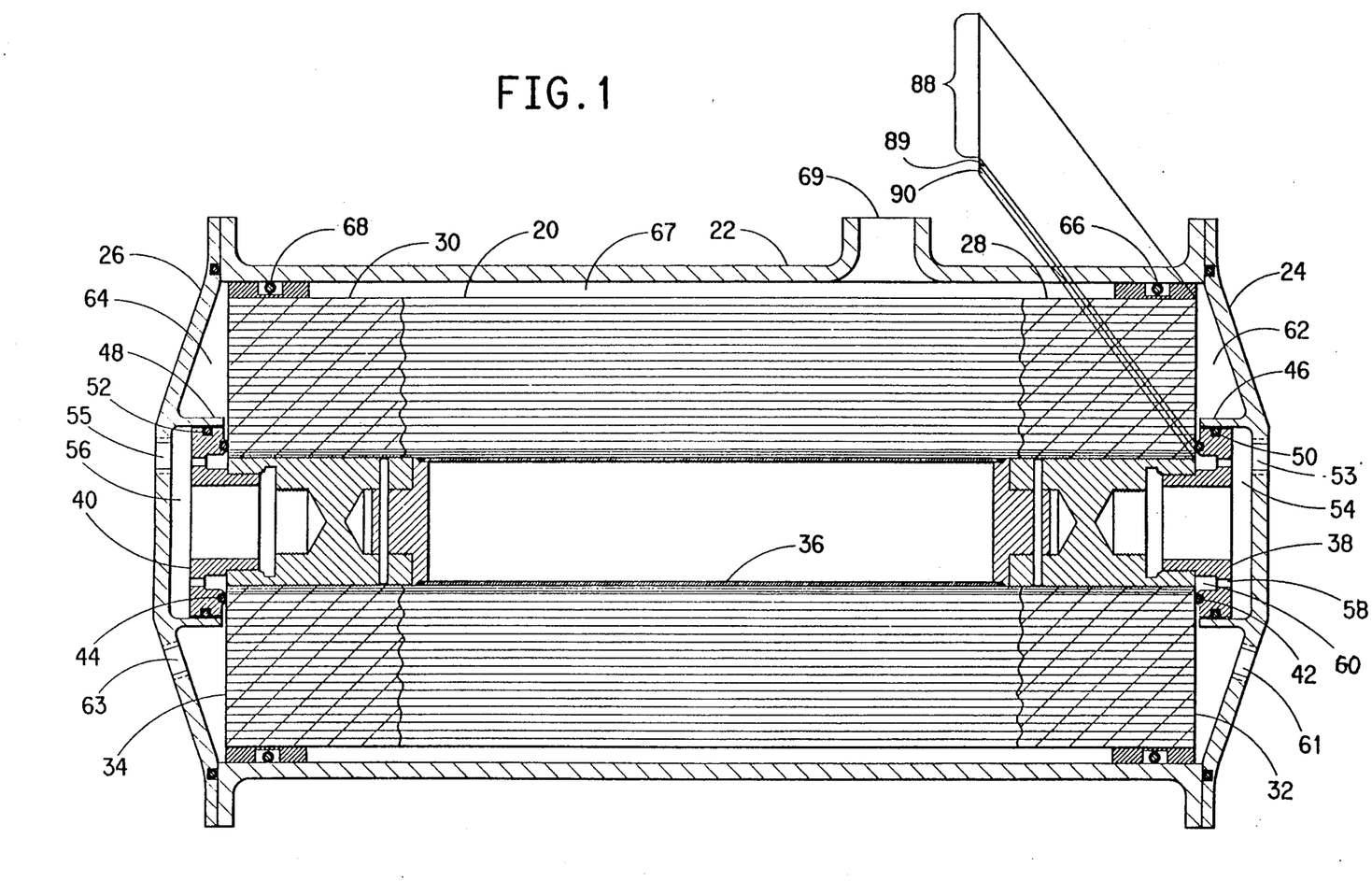
FIG. 1 shows a shell-type, standard, double ended tubesheet, fiber bundle with special flow channeling at the ends to divide the bundle into two concentric groups of fibers.

FIG. 1 shows a hollow fiber bundle 20 inside a shell 22 closed by end caps 24 and 26. There are tubesheets 28 and 30 at both ends of the bundle where the fibers are joined or sealed with epoxy and the faces 32 and 34 are cut back to expose the bores of the hollow fibers for fluid communication axially through the bundle. The center of the bundle contains a support structure 36 extending from one tubesheet face to the other. To save weight and cost, the support is preferably hollow over most of its length. The ends of support 36 are threaded to accept flow channel adapters 38 and 40, which are threaded in until seals, such as "o"-rings 42 and 44, seal directly against fibers at end faces 32 and 34, respectively, to form a seal between a first portion 90 and a second portion 88.

The end caps 24 and 26 have cylindrical walls 46 and 48, respectively, that form cavities that enclose the outer diameters of adapters 38 and 40, respectively. End caps 24 and 26 together with adaptors 38 and 40, respectively, as an assembly when attached to the shell form the enclosing means in this Figure. Seals, such as "o"-rings 50 and 52, seal between the adapters and the end cap cavity walls to create enclosed inner volumes 54 and 56. It is advantageous to seal on the inner surface of walls 46 and 48 that are axially aligned with the bundle axis. As the bundle axis expands and contracts or shifts slightly with different operating conditions, the seals 50 and 52 can slide axially while still maintaining a seal. This condition also exists with bundle seals 66 and 68 moving relative to shell 22. Ports 53 and 55 provide means for external fluid communication to volumes 54 and 56, respectively. These volumes are in fluid communication with a first portion 90 of the hollow fiber bores that fall within the sealed circumference of seals 42 and 44. The communication is via orifices or holes, such as 58, and annuli, such as 60, in adapter 38 and similarly in adapter 40.

A second portion 88 of the hollow fiber bores fall outside the seal circumference and are in fluid communication with outer annular volumes 62 and 64 which are defined between adapter seal 50, seal 42, and tube bundle seal 66; and adapter seal 52, seal 44, and tube bundle seal 68. The end cap attachment with the shell seals annular volumes 62 and 64 from the outside of the permeator. Ports 61 and 63 provide means for external fluid communication to volumes 62 and 64 respectively. Between seals 66 and 68 is an annular volume 67 that surrounds the bundle 20. This volume is in fluid communication with the outer surfaces of the hollow fibers and is in communication with the outside of the shell via port 69.

There is a third portion 89 of hollow fiber bores that fall directly under seals 42 and 44 and are therefore not in communication with volumes 54, 56, 62 and 64. This is seen more clearly in FIG. 9 which is a diagram of end faces 32 and 34, showing the seal footprint 70 of seal 42 and seal footprint 72 of seal 44. Bore 78 represents the third portion of fibers which are blocked at both ends. Spiral lines 74 and 76 represents the paths of hollow fiber bores that results when the fibers are wrapped to form bundle 20 as is described in U.S. Pat. No. 3,801,401 which is incorporated herein by reference. In the patent, the hollow fibers are wound around a permeable web support which is then wound about a core to form a convolute or "jelly-roll" structure. Epoxy resin is applied along the edges of the web during winding to seal the fibers at the ends of the cylindrical structure, thereby forming a tubesheet as the web is wound up.

Figure 12:
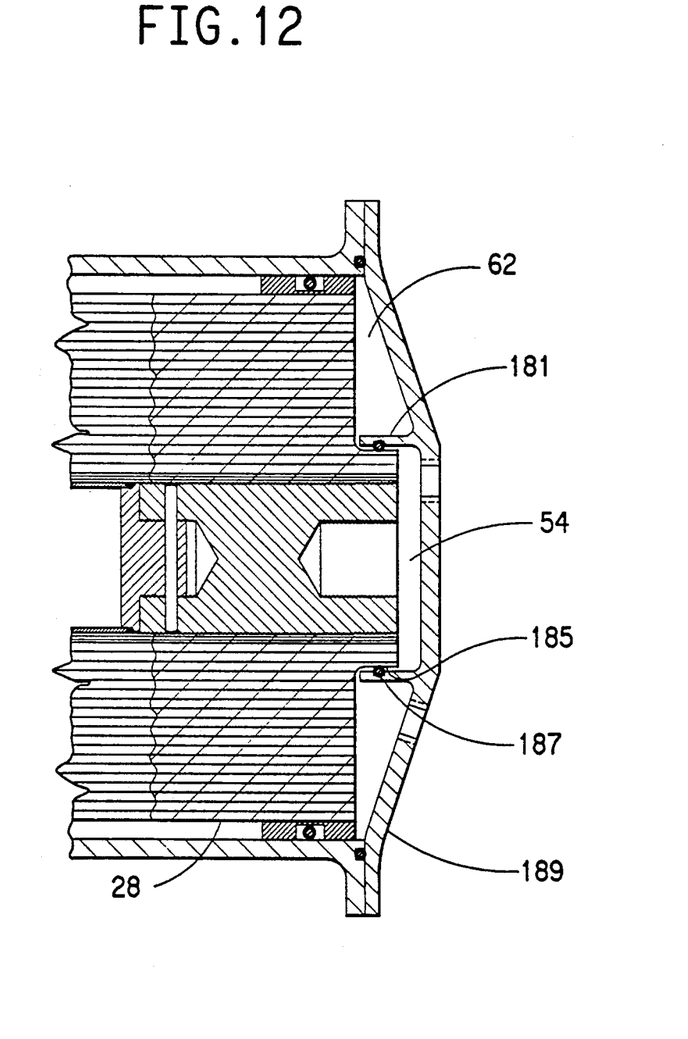
FIG. 12 shows one end of a version of a permeator of FIGS. 1 or 2 in which the tubesheet has been cut back to provide an extension to define the portions.

The third portion of hollow fiber bores that are blocked by seals 42 and 44 of adapters 38 and 40 can be eliminated by machining the end of the tubesheet to form an extended portion resembling the adapter. Such a variation is shown in FIG. 12 where the extension 185 is provided by cutting back the end of tubesheet 28. Tubesheet 30 on the opposite end would be cut essentially the same so that the fibers in its extension would be the same fibers as those in extension 185 of tubesheet 28. Cavity seal 187 in cavity wall 181 of end cap 189 seals directly against the fiber in the cut side of extension 185 to separate inner volume 54 from outer volume 62. It may be desirable to apply a thin coating of resin or the like to the cut surface of the fibers to provide an improved surface for seal 187.

FIBER ALIGNMENT

Some care must be exercised when forming the bundle to assure fibers are essentially aligned and that the end caps are essentially aligned with the tube sheets to separate the fibers into concentric portions. This is important so that the fibers of a portion on one end are the same fibers that are in the corresponding portion on the other end. The significance of this will be described referring to FIG. 9 and understanding that as a feed gas pressure is applied to the bore of a fiber, about 70% of the feed flow permeates through the fiber wall and about 30% exits the fiber bore. Such fibers may be any hollow fiber membrane known in the art, preferably asymmetric hollow fiber membranes with a skin on the outside.

Figure 9:
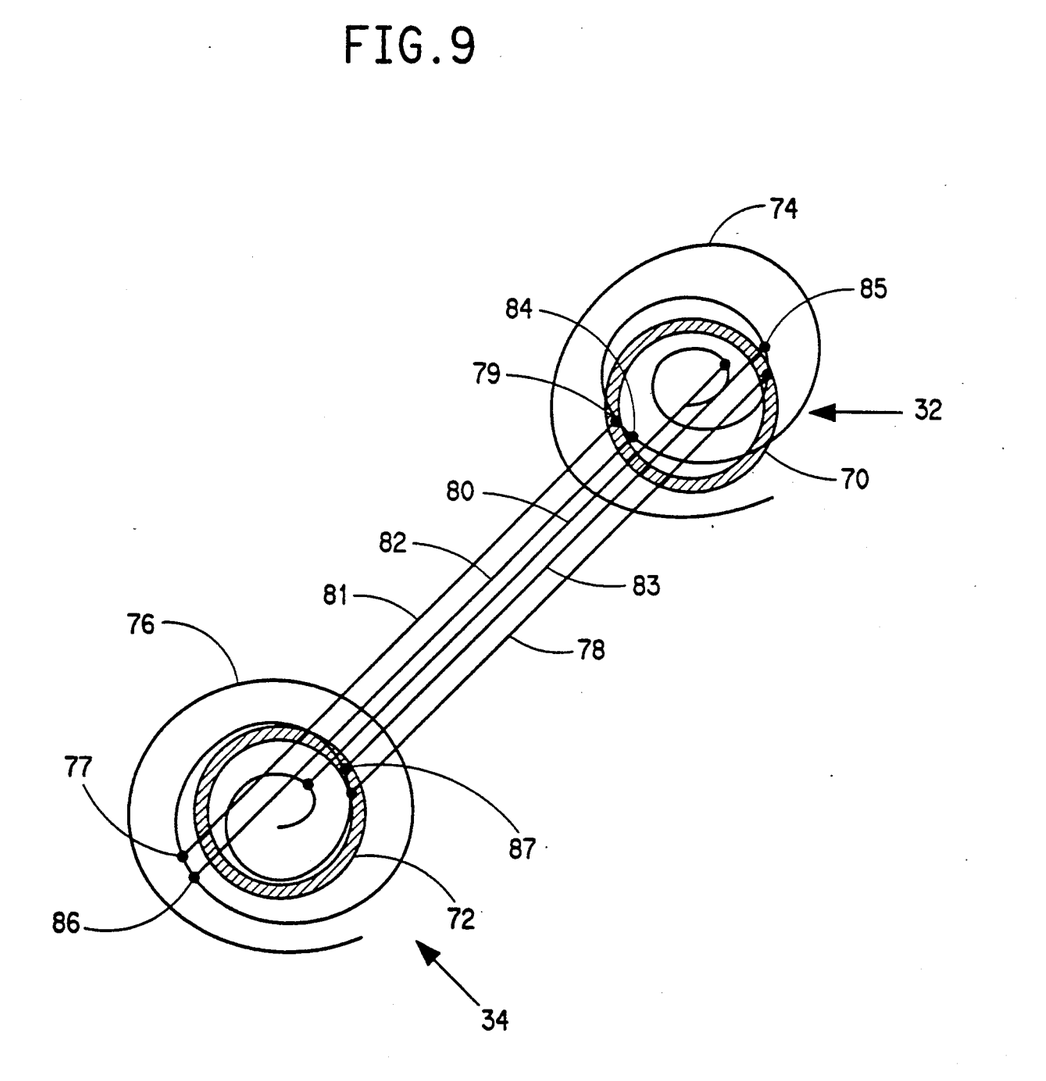
FIG. 9 shows possible flow paths within a permeator of the type in FIGS. 1 and 2 when the hollow fibers are aligned with the flow channeling means differently from one end to the other.

Line 78 represents a single continuous hollow fiber bore communicating with faces 32 and 34. In this case, bore 78 is part of the third portion of hollow fibers that are blocked by the seal footprints so no fluid communication with the bore takes place. This is a preferred situation. Line 80 represents another bore which is part of the first portion communicating with inner volumes 54 and 56. This is also a preferred situation. Lines 81, 82, and 83 represent fibers whose bores are positioned inappropriately with respect to the seal footprints so that the bore openings on the two ends of a fiber communicate with two different portions of the permeator. Bore 83 has bore opening 85 at face 32 communicating with the second outer portion, volume 62; and has bore opening 87 at face 34 communicating with the third sealed portion, footprint 72. Where only the outer concentric portion is used, this situation results in a "leakage" path where the gas fed in at face 32 under pressure will permeate or "leak" through the fiber wall and no product will be collected. Bore 81 has bore opening 79 at face 32 communicating with the third sealed portion, footprint 70; and has bore opening 77 at face 34 communicating with the second outer portion, volume 64. Where only the outer concentric portion is used, this results in the product in volume 64 passing into the fiber in a reverse direction and "leaking" through the fiber wall, thereby losing product. Bore 82 has bore opening 84 at face 32 communicating with the first inner portion, volume 54; and has bore opening 86 at face 34 communicating with the second outer portion, volume 64. This situation is not likely to occur except with gross misalignment. Where only the inner concentric portion is used, flow into bore 82 results in the feed passing into the outer concentric portion and reverse flowing into all the fibers of the outer portion where it "leaks" through the fiber walls to the non-product side. Although the "leakage" losses described with fibers 81, 82, and 83 are undesirable, with care in forming the fiber bundle and aligning the end caps with the bundle end faces, they occur with only a few fibers and do not prevent effective operation of the permeator.

BUNDLE OPERATION

A permeator system for separating one gas product from a mixture of that gas and at least one other gas comprises the hollow-fiber permeator of this invention having one or more inlet lines feeding the mixture of gases to the permeator and one or more outlet lines for withdrawal of a product. A pressure differential is maintained across the hollow-fiber membrane so as to cause a permeated and a non-permeated gas to be formed. The product may be the non-permeated gas or it may be the permeated gas.

The hollow-fiber permeator has a plurality of first connecting lines for feeding the gas mixture to a plurality of ports providing fluid communication through an enclosing means to a plurality of first sealed volumes formed by that enclosing means. It also has a plurality of second connecting lines for feeding the retentate gas mixture from a plurality of ports providing fluid communication through an enclosing means from second sealed volumes formed by that enclosing means and corresponding to and in fluid communication with the first sealed volumes. The second connecting lines are connected to one or more outlet lines if the desired product is the non-permeated gas. If membranes having different separating characteristics are used in the bundle portions defined by the sealed volumes or different feed streams are fed to the different first sealed volumes, separate non-permeated product streams can be collected from the corresponding second connecting lines.

One or more of the first connecting lines has a valve means therein for stopping the flow of feed gas into unused bundle portions and the second connecting lines have a means to prevent backflow of retentate gas into unused bundle portions. The system preferably has a sensing means for determining needed product flow or for determining actual product flow in the outlet line. The sensing means is connected to the valve means in the first connecting lines for actuating the valve means to stop flow to selected bundle portions when sensing means determines needed product flow can be satisfied by feed to non-selected bundle portions or when actual product flow is within a predetermined range for efficient operation with the non-selected bundle portions.

Figures 4, 8:
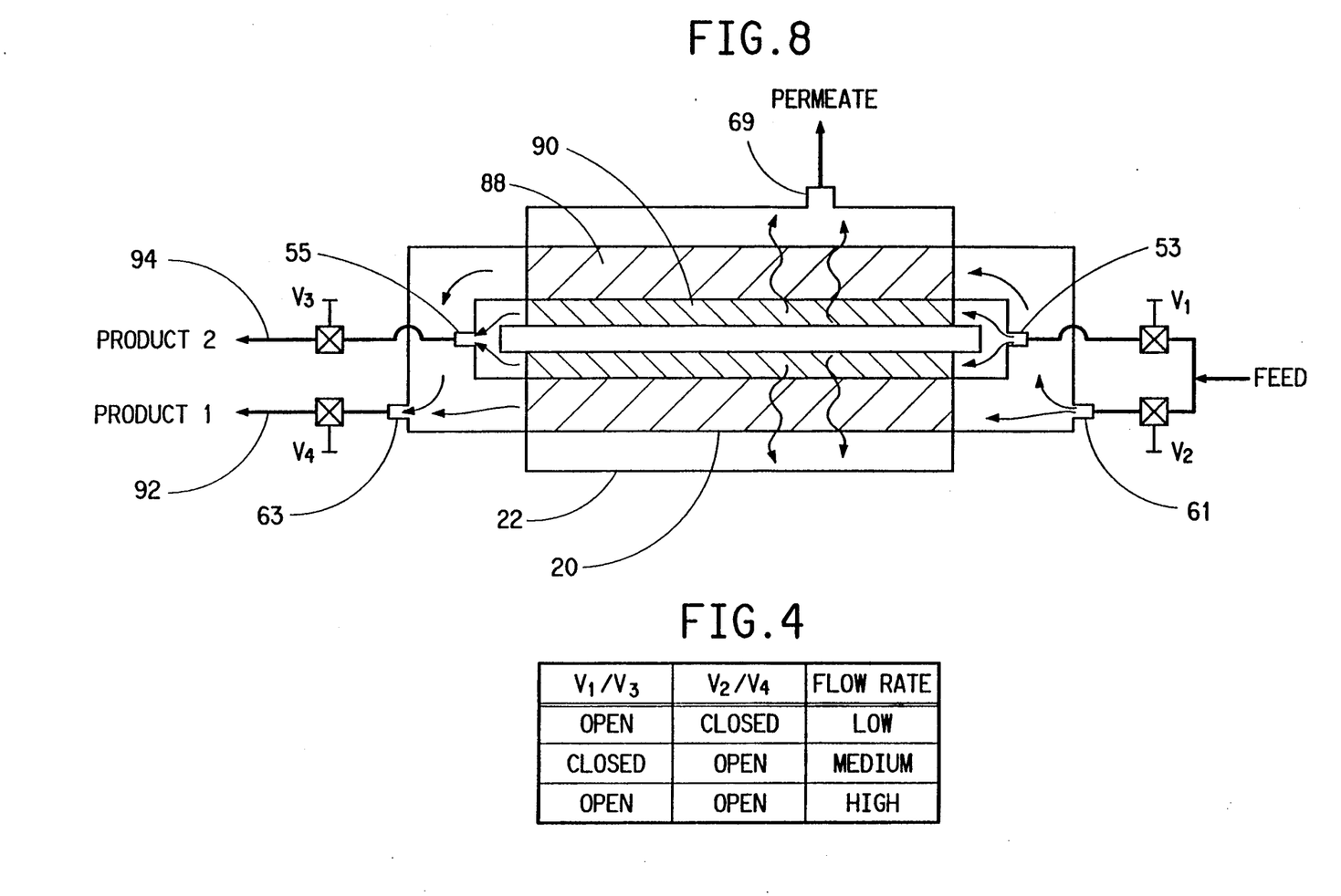
FIG. 4 shows a table of various valve states to operate a permeator with two concentric hollow fiber bundle portions to achieve different outputs.
FIG. 8 is a flow diagram showing how three different flow rates can be achieved with two concentric fiber bundles.

FIG. 8 shows the flow through the permeator of this invention to achieve three different flow rates through the two concentric portions of hollow fibers of the permeator. In this case, the permeator operates with pressurized feed gas entering the fiber bores, the non-permeate (product) exiting the fiber bores, and the permeate (non-product) passing from the inside to the outside wall of the hollow fibers. In some cases, the permeate may be the desired product and the gas exiting the fiber bores would be a non-product.

In FIG. 8, valve $V_2$ is connected to port 61 and valve $V_4$ is connected to port 63 to regulate flow to the second outer portion 88 of the hollow fibers. Valve $V_1$ is connected to port 53 and valve $V_3$ is connected to port 55 to regulate flow to the first inner portion 90 of the hollow fibers. The inlet valves $V_1$ and $V_2$ are important to prevent feed gas pressure and flow from entering any fiber bundle portion not being used where leakage permeation would occur. The outlet valves $V_3$ and $V_4$ are important to prevent backflow of product gas pressure and flow from entering any unused fiber bundle portion resulting in product loss due to permeation leakage. $V_3$ and $V_4$ can be check valves and, if one portion of the bundle is to be continuously used, the valves on both ends of that portion may be eliminated.

The table of FIG. 4 shows the various valve states to achieve three flow different flow rates from the concentric permeator. For these different flow rates, there are substantially different numbers of hollow fibers in the inner and outer portions. If only two flow rates are desired, the inner and outer portions may contain substantially the same number of fibers. The permeator may be operated as an air separator with nitrogenenriched-air (NEA) as a product gas and oxygen-enriched-air (OEA) as a permeate.

If a medium flow rate is desired, valves $V_1/V_3$ are closed and valves $V_2/V_4$ are opened. The feed gas, air, enters through valve $V_2$, through port 61, and through the second outer portion of hollow fibers 88. The permeate, OEA, passes through the wall of the hollow fibers and flows radially through the bundle and out port 69. The product gas, NEA with less than 9% and preferably no more than 5% oxygen, flows out of the hollow fiber bores, through port 63, through valve $V_4$ and through product 1 line 92.

If a low flow rate is desired, valves $V_2/V_4$ are closed and valves $V_1/V_3$ are opened. The air flows through $V_1$, port 53, and through the first inner portion of hollow fibers 90. The permeate flows radially through the bundle and out through port 69. The product, NEA, flows out of the fibers, through port 55, valve $V_3$, and through product 2 line 94. In some cases it may be desired that the product streams go to the same destination, in which case product lines 92 and 94 may be manifolded together. In this case it is important that valves $V_3$ and $V_4$ are appropriately closed as discussed when operated at low or medium flow rates to prevent back flow through the inactive portion of hollow fibers where flow losses would occur.

When a high flow rate is desired, all valves are opened and both first and second portions of the hollow fibers separate the feed gas simultaneously.

The two product streams 92 and 94 can also be products that differ, for instance, in the purity of the product by tailoring the physical characteristics of the fibers used in the different portions of the bundle. For instance, portion 88 could provide one purity product and portion 90 could provide another purity product from the same feed. An example of such operation would be producing both 98% nitrogen and 92% nitrogen enriched air from the same air feed.

When operating the valves to provide two separate products, either one product can be collected at a time by operating the valves at the low or medium flow rate settings of FIG. 4; or both products can be collected simultaneously by operating the valves at the high flow rate setting.

The two different product streams can also be obtained from two different feed streams where the permeate of the two feed streams will be compatible with the outer surface of the fibers and will not produce a hazardous mixture. For instance, one feed stream may be air with the permeate being OEA and the non-permeated product being NEA; and the other feed stream could be a mixture such as nitrogen and carbon dioxide where the permeate would be $CO_2$ enriched and the product would be $N_2$ enriched. The $CO_2$ enriched gas and the OEA would mix safely in the permeate stream from both portions of fibers.

SHELL-LESS CONCENTRIC PERMEATOR

Figure 2:
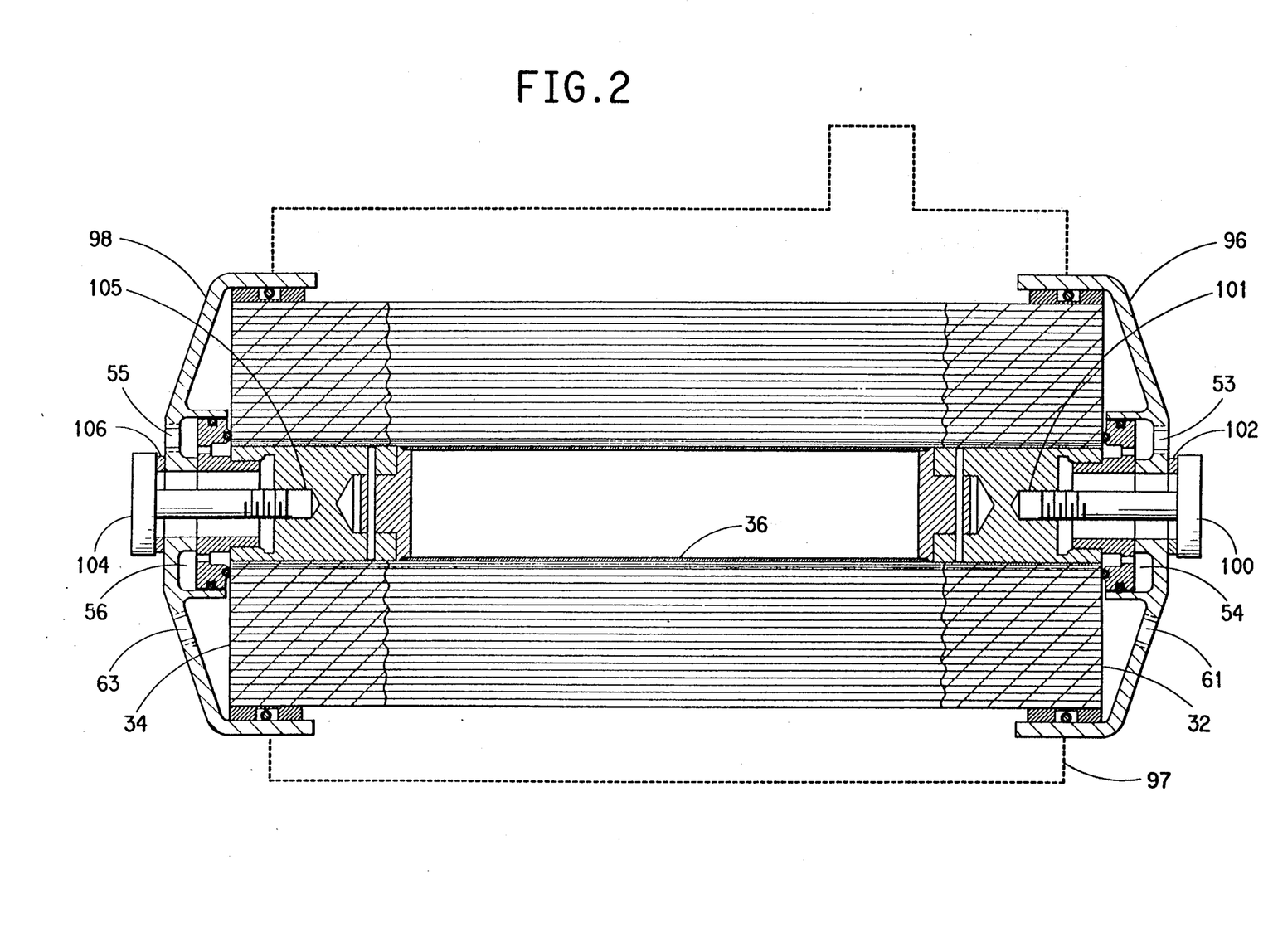
FIG. 2 shows the permeator of FIG. 1 adapted for a Shell-less type configuration.

FIG. 2 shows a useful variation of the permeator of the invention where the shell has been eliminated, and modified end caps 96 and 98 are attached to the ends of the support structure 36 adjacent the end faces 32 and 34. Such a shell-less permeator structure is described in U.S. Pat. No. 4,871,379 which is incorporated herein by reference. Such a design reduces the weight, cost and complexity of the permeator and is especially useful where more than one permeator is provided in a low cost vented enclosure suggested by dashed lines at 97.

Bolt 100, threaded into hole 101 of support 36, and seal 102 hold end cap 96 in place. Bolt 104, threaded into hole 105 of support 36, and seal 106 hold end cap 98 in place. Seals 102 and 106 prevent fluid leakage from volumes 54 and 56 respectively. Other details of the permeator are similar to that of FIG. 1.

BUNDLE AND TUBESHEET BARRIERS

Improved separation can be achieved by installing a means for establishing counter-current flow of the permeate on one side of the membrane to the flow of the feed on the other side of the membrane. Preferably the means assures that co-current flow is avoided and radial flow of the permeate is minimized.

Figure 3:
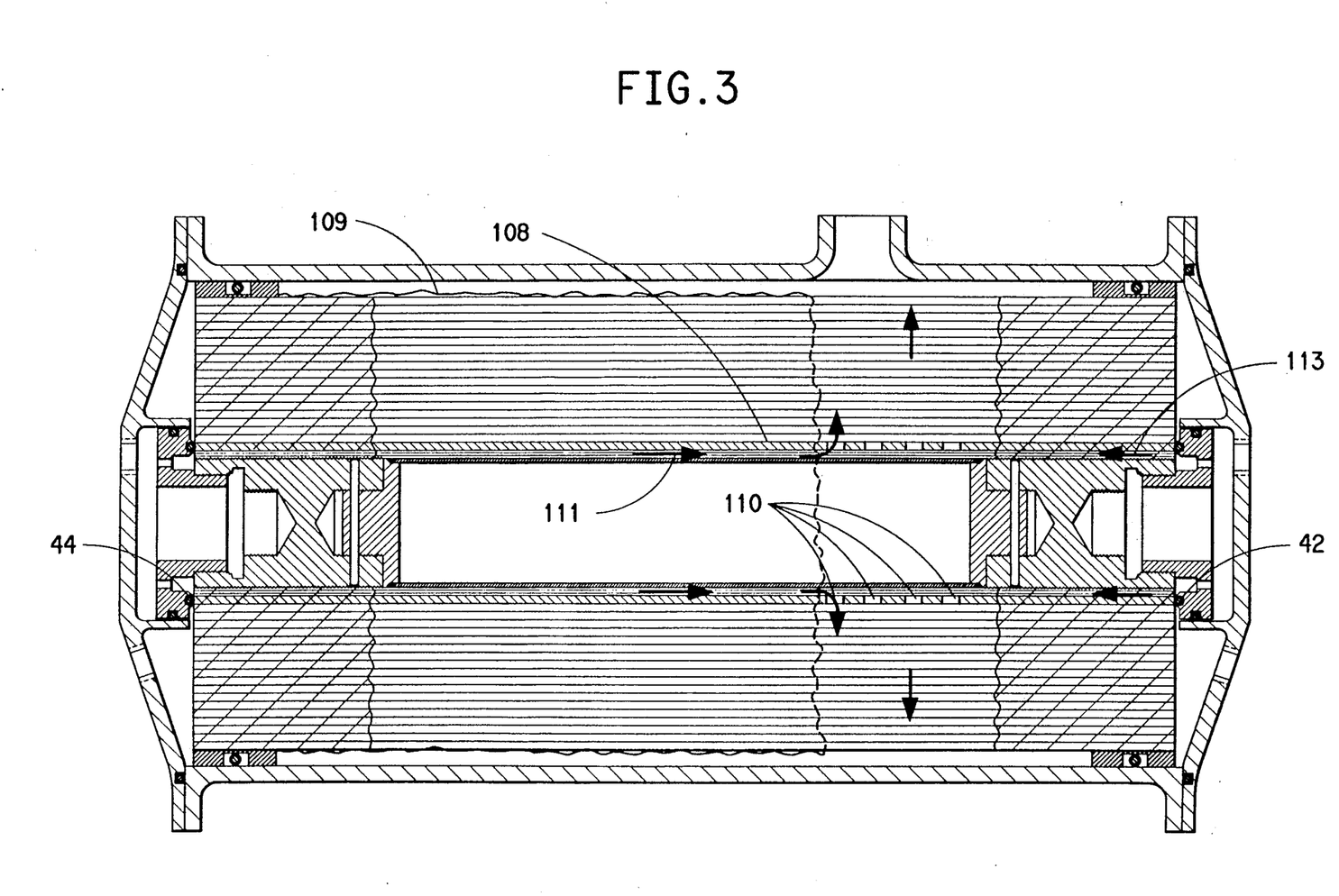
FIG. 3 shows a shell-type, double ended tubesheet, fiber bundle with a special wound-in separator and special flow channeling at the ends to divide the bundle into two concentric groups of fibers.

FIG. 3 shows another useful variation of the permeator of the invention where impermeable barriers 108 and 109 with no hollow fibers have been wound into the bundle during fabrication.

Barrier 108 is positioned between the portions of the bundle, the ends of barrier 108 providing a solid footprint area for the seals 42 and 44 without hollow fiber bores where flow losses discussed in reference to FIG. 9 may occur.

During fabrication of a bundle in accord with U.S. Pat. No. 3,801,401, a spun-bonded material is continuously wound with the hollow fibers to provide a permeable support for them. Resin is applied at the ends to form impermeable tubesheets. By omitting hollow fibers, the barrier will be formed at the ends when the resin is applied. The barrier intermediate between the ends can be formed by spraying resin over about 400 degrees of the spun-bonded material where the hollow fibers are omitted. Alternatively, the barrier may be formed by wrapping an impermeable film such as Mylar ® into the bundle at the point where the barrier is desired. A bead of resin can be applied to the trailing edge of the impermeable film to form a film tube.

In either case, the intermediate barrier 108 is sealed at one tubesheet and is spaced from or has openings at the other tubesheet (feed end) so that low-pressure-drop, radially-directed fluid flow can occur. The spacing or openings are represented by apertures 110 only around the feed end. They permit the permeate to flow from the first inner portion of the bundle fibers. This forces the permeate to flow in a counter-current direction 111 to the feed flow through the bores 113 which is beneficial to maximize the difference in oxygen partial pressure across the fiber walls. U.S. Pat. No. 4,871,379 which is incorporated herein by reference, more fully describes this benefit.

Barrier 109 forces the permeate to flow in a counter-current direction for the second outer portion of the bundle fibers. It preferably is an impermeable film such as Mylar ®. The film preferably is wrapped over the hollow-fiber bundle in a manner that is sealingly engaged or is nearly in contact with the tubesheet at the discharge end and is closely spaced but not engaged with the other tubesheet in a manner that allows adequate flow of permeate to the shell port 69, preferably within 1 to 3 inches of the tubesheet.

The permeator in FIG. 3 can be adapted to a shell-less version in a manner as described in reference to FIG. 2.

SEPARATE BUNDLE PORTIONS

Figure 5:
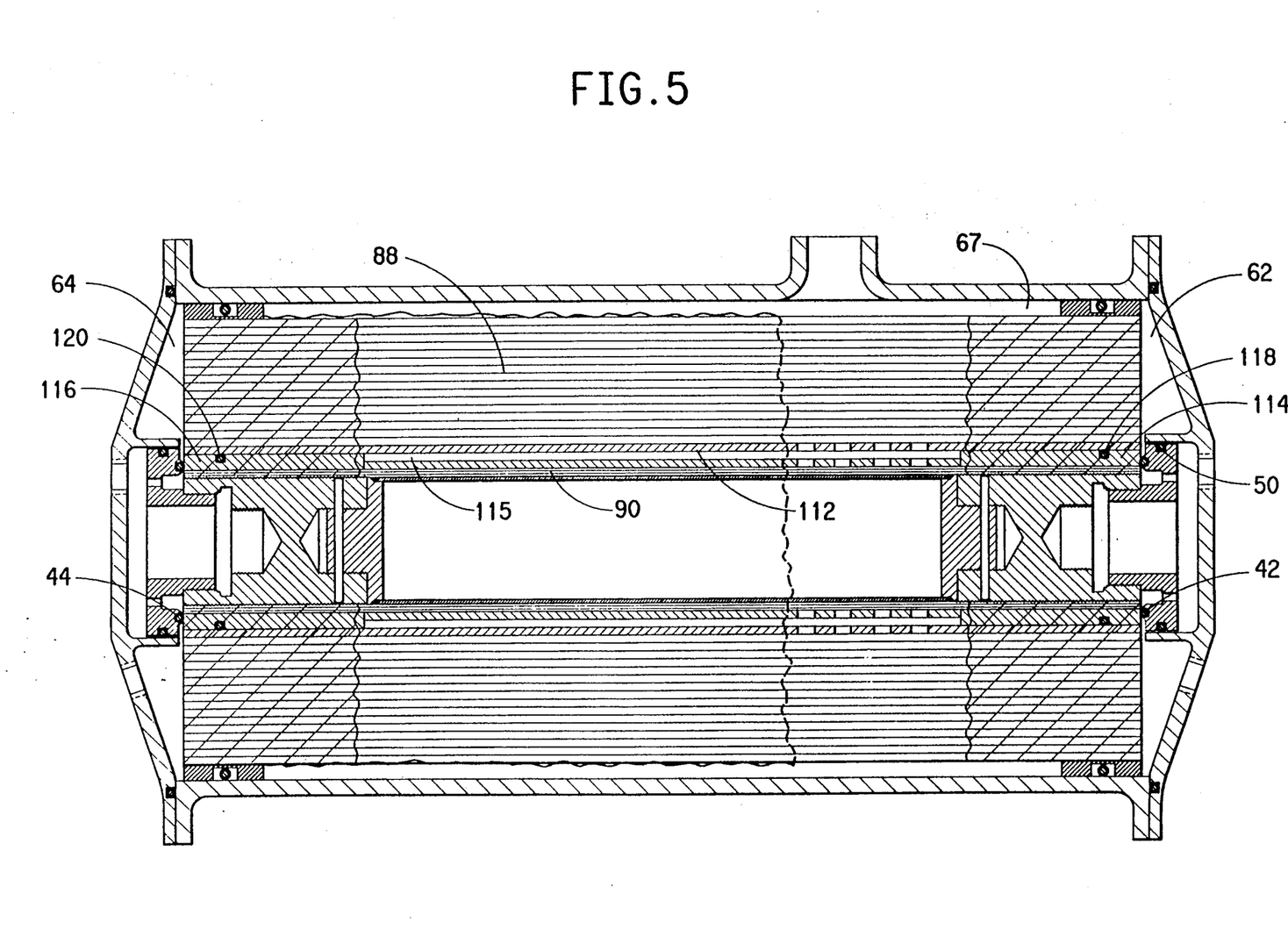
FIG. 5 shows a shell-type, double ended tubesheet, hollow fiber permeator where there are two separable fiber bundles arranged concentrically one within the other and there is special flow channeling at the ends to divide the bundles into two concentric groups of fibers.

FIG. 5 shows yet another useful variation of the permeator of the invention where the first inner portion of fibers 90 is physically separable from the second outer portion of fibers 88. In this case, the second portion of hollow fibers is wound around its own support structure 112, which can be a straight tubular structure as shown. The tubesheet section of the first portion of the hollow fibers is modified by building up collars 114 and 116 to provide a footprint surface for seals 42 and 44, respectively, and to provide seal grooves for seals 118 and 120. These latter seals cooperate with the inner surface of support 112 to prevent leakage from volumes 62 and 64 into annular volume 115 surrounding the inner portion of the hollow fibers and eventually into the outer portion of the annular volume 67 surrounding the hollow fibers. The advantage of having the first and second portions separable is that the entire permeator need not be replaced if the fibers in one portion develop problems at fabrication or after use. It is also an advantage if one of the portions is used much more frequently than another portion and, therefore, declines in operating efficiency.

TRIPLE CONCENTRIC PERMEATOR

Figure 6:
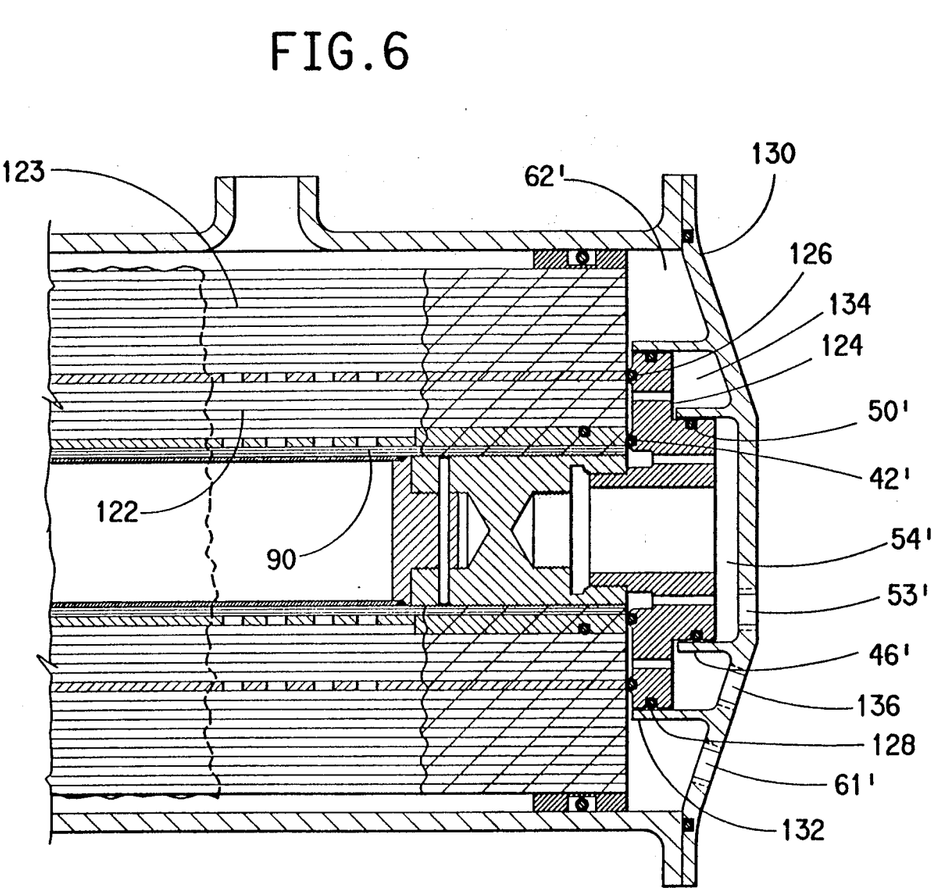
FIG. 6 shows a permeator arrangement similar to FIG. 3 where there are two wound-in separators and special flow channeling at the ends to divide the bundle into three concentric groups of fibers.

FIG. 6 shows still another useful variation of the permeator of the invention where there are three concentric portions of hollow fibers available for gas separation, an inner portion 90, an intermediate portion 122 and an outer portion 123. This provides the possibility for seven different flow rates or three product streams that differ, for instance, in the purity of the product as already described with reference to FIG. 8.

In the permeator of FIG. 6, a modified flow channel adapter 124 is provided with two end face seals 42' and 126 and two cavity seals 50' and 128 that cooperate with modified end cap 130. End cap 130 has cylindrical walls 46' and 132 that enclose the outer diameters of adapter 124 and create enclosed volumes 54', 134 and 62'. Volume 54' is in fluid communication with an inner portion of the hollow fiber bores that fall within the circumference of seal 42' and with port 53'. Volume 134 is in fluid communication with an intermediate portion of the hollow fiber bores that fall between the outer circumference of seal 42' and the inner circumference of seal 126, and with port 136. Volume 62' is in fluid communication with an outer portion of hollow fiber bores that fall beyond the outside circumference of seal 126 and with port 61'. As can be seen, fluid communication with three separate portions of hollow fibers can take place through the arrangement of seals and ports just described using valves and piping in a manner similar to that described in reference to FIG. 8 when discussing a double concentric permeator.

CONICAL TUBESHEETS TO REDUCE WEIGHT

Figure 7:
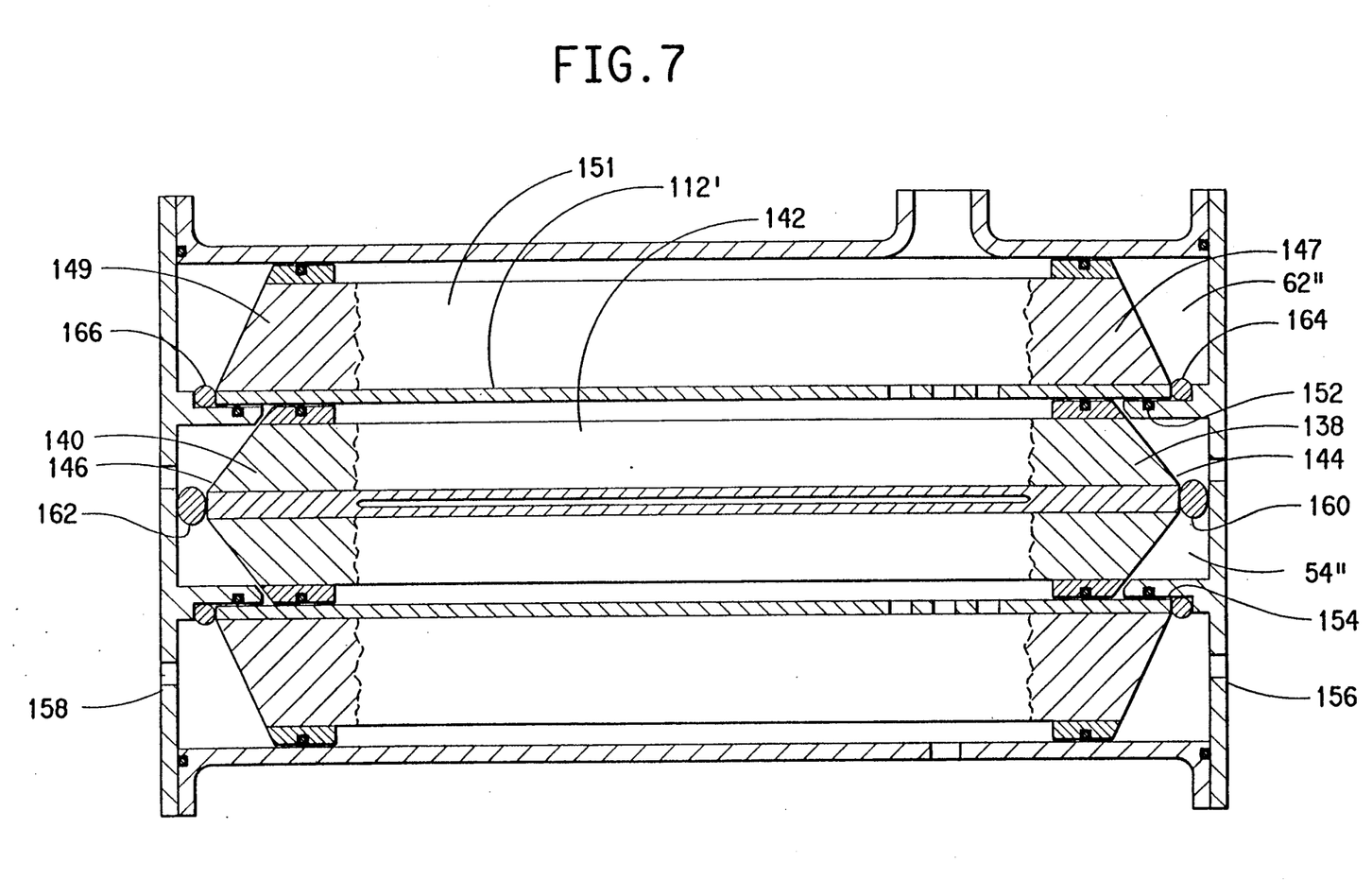
FIG. 7 shows a different means of flow channeling at the ends for a permeator similar to that of FIG. 5.

FIG. 7 shows still another useful variation of the permeator of the invention similar to the separable variation of FIG. 5 where the ends on the tubesheets have been modified to eliminate the flow adapters and there are minor cap modifications. The tubesheets 138 and 140 of separable inner portion 142 have been modified by cutting the end faces 144 and 146 in a cone shape instead of a flat plane. This is permissible since the combined shear and bending stresses within the tubesheet are at a maximum near the center, and decline to zero at the outside edge. In the aircraft application for the permeators mentioned earlier, weight is a critical factor so extra thickness to the tubesheet is a concern. By cutting the face as shown, the extra thickness is removed and weight is saved. Tubesheets 147 and 149 of the separable outer portion 151 are cut similarly as shown. The conical cutting of tubesheet 138 also provides space for an alternate simplified sealing arrangement where the face seal 42 and cavity seal 50 of FIG. 5 can be replaced by a single seal 152. Seal 152 is held in a groove in cylindrical wall 154 on modified end cap 156. Seal 152 cooperates with the inner surface of support tube 112' to complete the sealing of volume 54" from volume 62". The opposite end of the permeator is constructed and sealed the same. End caps 156 and 158 are shown as flat caps, but they could also have a conical or spherical shape to match the end of the outer portion tubesheet to thereby save additional weight by shortening the cylindrical shell.

To insure that portions 142 and 151 do not shift axially between end caps 156 and 158 due to inertia, vibration, pressure or other forces, elastomeric bumpers may be employed. Elastomeric bumpers 160 and 162 stabilize portion 142 and bumpers 164 and 166 stabilize portion 151.

Conical tubesheets may also be used to reduce weight in other configurations employing the various end enclosure means depicted in this application.

NON-CONCENTRIC PERMEATOR

Figure 10:
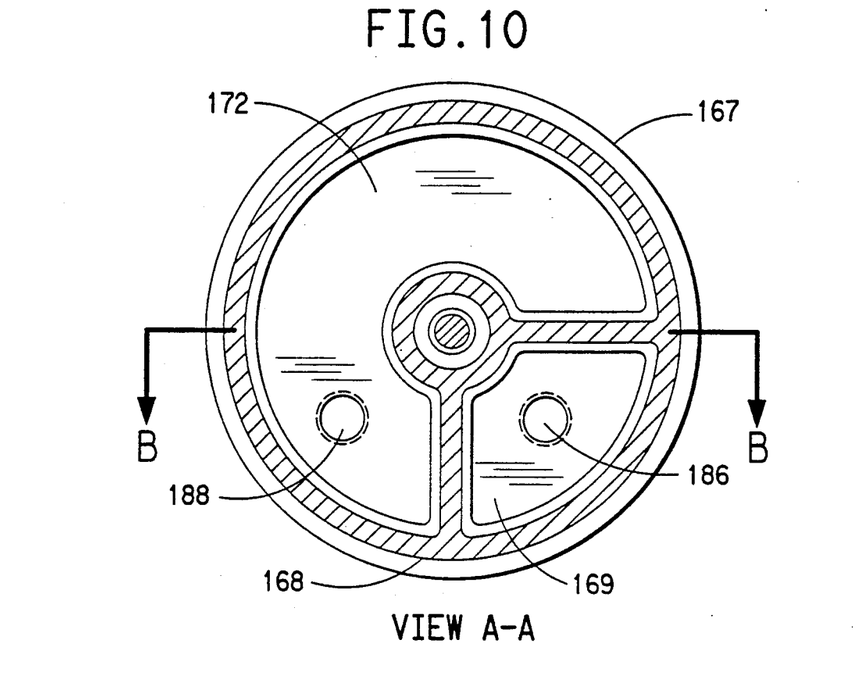
FIG. 10 shows the end cap for a version of the permeator having a non-concentric arrangement of fiber portions.
Figure 11:
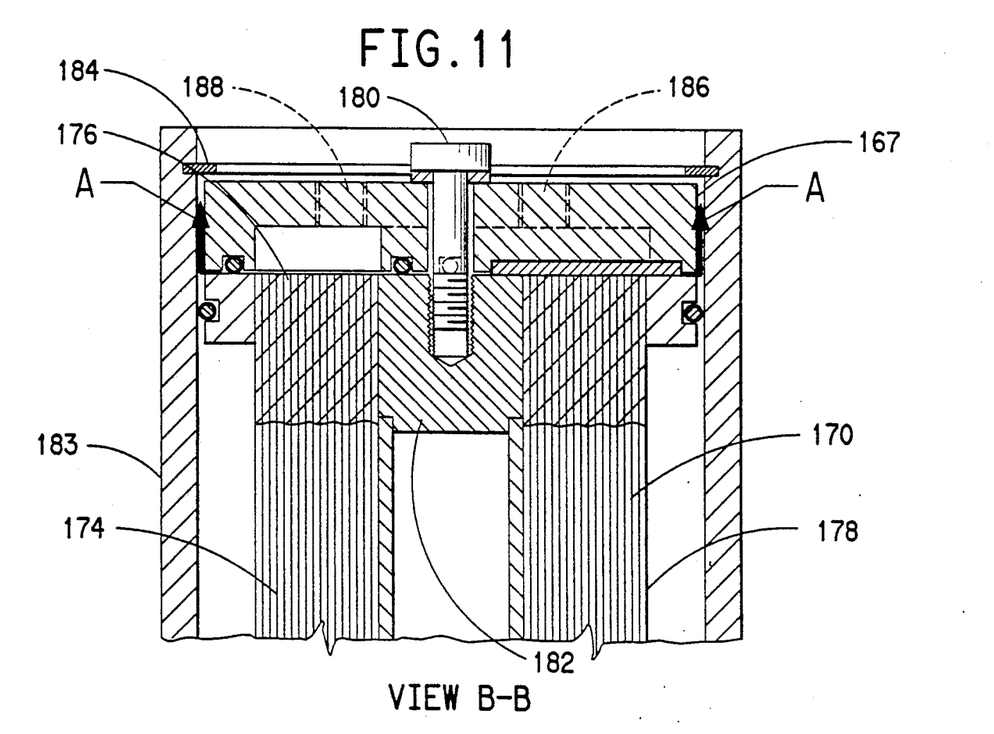
FIG. 11 shows a sectional view of the end of the permeator of FIG. 10 having a non-concentric arrangement of fiber portions.

Although the invention has been described in terms of a concentric relationship between the different bundle portions, other geometric arrangements are possible as exemplified in FIGS. 10 and 11. FIG. 10 shows a permeator end cap structure 167 with a seal pattern 168 that divides the permeator tube bundle 178 (similar to the bundle of FIG. 1) into non-concentric portions. A first sealed area 169 defines a first portion 170, and a second sealed area 172 defines a second portion 174. As can be seen in FIG. 11, the cap 167 is attached to one tubesheet end 176 of the fiber bundle 178 by bolt 180 which is threaded into central support 182. On the opposite tubesheet end (not shown) an end cap with an opposite hand seal pattern would be similarly attached. The two caps would be rotationally aligned so a portion of fibers having their ends in a sealed area at one tubesheet end would be the same portion of fibers having their other ends in the corresponding sealed area at the other tubesheet end. The tube bundle with attached end caps is placed in a shell 183 and held in position there by retaining rings on each end, such as ring 184. Port 186 provides fluid communication to portion 170 and port 188 to portion 174. Similar ports in the end cap on the other end makes possible fluid communication similar to that described in reference to FIG. 8. In general, the permeator of FIGS. 1 and 11 both have in common a fiber bundle divided into multiple portions that are adjacent to one another in a compact arrangement with flow paths to the respective portions. The end cap structure shown in FIGS. 10 and 11 where the end cap is directly held against the tubesheet may be applied to the permeators of FIGS. 1, 2, 3, 5 and 6 with the advantage that expansion or contraction of the tube bundle structure does not affect the seal with the tubesheet portions and require special moving seal structures.

AIRCRAFT FUEL TANK INERT GAS SUPPLY SYSTEM

Figure 13:
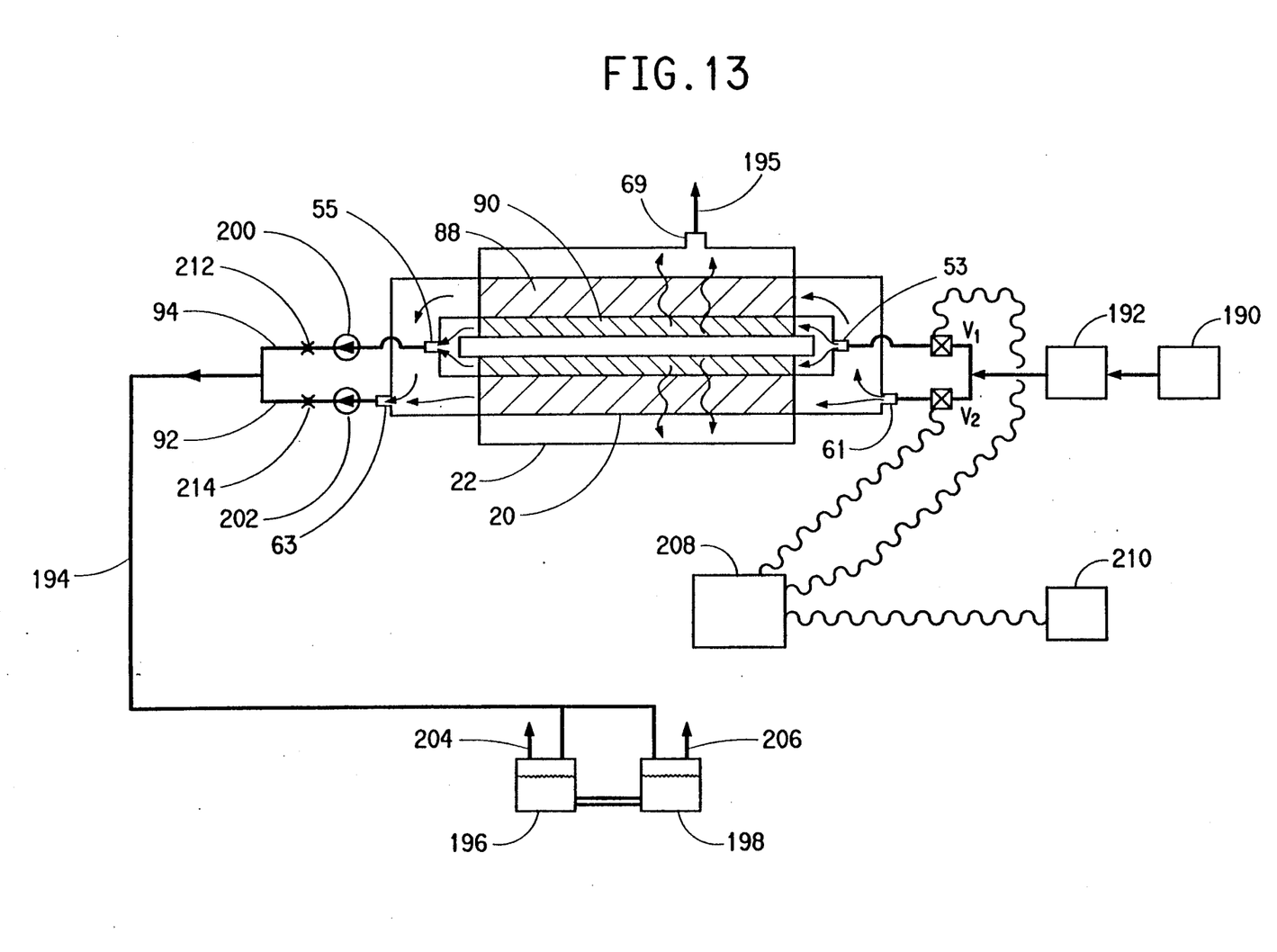
FIG. 13 shows use of a permeator in an aircraft fuel tank inerting system.

FIG. 13 shows how the permeator of the invention may be employed in an aircraft fuel tank (enclosed volume) inerting system. The two-portion permeator bundle 20 in shell 22 is provided with pressurized air from an engine generated pressure source 190 which feeds a conditioning unit 192 where the air is filtered, heated or cooled, pressure regulated and otherwise conditioned so as to protect the permeator and achieve effective operation.

Flow of NEA from the permeator is directed through line 194 to the space over the fuel in fuel tanks 196/198. Check valves 200 and 202 prevent backflow of NEA into the unused portion of the bundle and prevents backflow of fuel gases into the permeator. Flow-limiting orifices 212 and 214 limit the flow through the bundle portions. Tank vents 204 and 206 dump excess inerting gas and allow pressure equalization with the outside. Flow of OEA from the permeator is directed through line 195 to an exhaust. Alternatively, it could be used, for example, as a source of breathing air. Valve selector unit 208 determines the state (fully or partially open or shut) of flow regulating means (valves $V_1$ and $V_2$) based on sensory input from sensing means 210 for determining the needed NEA flow. Sensing means may consist of an ambient pressure rate change sensor, an oxygen sensor in the NEA stream or space to be inerted, a pressure sensor for determining the difference between the pressure above the fuel in the fuel tanks and the ambient pressure outside the tanks, or any other sensor that is known for sensing a need for a change in permeator flow rates. In a simplified version of the system requiring only two flow rates, a continuous flow through one of the portions, say portion 90, can be maintained. In that case, $V_1$ may be omitted and, while check valve 200 can also be omitted, it preferably would be retained to prevent fuel vapor backup into the permeator during system shutdown.

For low flow rates such as during relatively constant altitude cruising, the sensor would be expected to be sensing conditions, little change in ambient pressure for example, that call for limited flow of NEA. In that case, $V_1$ would be open feeding air to inner bundle portion 90 and $V_2$ would be closed to prevent air feed to outer bundle portion 88. Check valve 200 will open to allow flow of NEA from bundle portion 90 to the volume being inerted, while check valve 202 would remain closed to prevent backflow of NEA into bundle portion 88.

For a rapid ascent, the sensor would be expected to determine the NEA need which would be expected to, on the one hand, increase due to rapid fuel consumption and, on the other hand decrease due to ambient pressure decreases. If the two effects balanced, the valve position and flow pattern would be the same as under low flow conditions. If fuel consumption were higher than compensating pressure changes, the sensor would send a signal to the valve selector unit which would in turn open $V_2$ and close $V_1$ for an intermediate flow, assuming that portion 88 had a higher capacity than portion 90, or open both $V_2$ and $V_1$ for a still higher flow. Pressure source 190 would provide higher flow rate to the permeator under increased NEA demand.

For a rapid descent, the ambient pressure would rapidly increase over the pressure inside the tanks. A pressure change sensor would send a signal to the valve selector unit which would be designed to recognize a need for increased flow of NEA and would, in turn, actuate $V_2$ and $V_1$, as needed, and increase feed to the permeator system. At the conclusion of the descent, the sensor would sense a lower need for NEA (low or zero pressure rate change) and would send a signal to the valve selector unit which in turn would cause the valves to actuate in a manner so as to reduce flow.

From the disclosure, one skilled in the art will be able to envision designs that permit varying flow according to needs. For example, low flow for level flight ($V_1$ open to small portion 90 and $V_2$ closed), medium flow for descent with nearly full tanks having little volume above the fuel ($V_2$ open to larger portion 88 and $V_1$ closed), or high flow for descent with nearly empty tanks having large volume above the fuel ($V_1$ and $V_2$ both open). Also, to reduce demand on pressure source 190 when more power to the engine is needed for propelling the aircraft, flow rates can be adjusted by actuating valves so as to limit flow to a small portion of the permeator.

If desired, the permeate, which is oxygen enriched air (OEA), from port 69 can be fed through line 195 for use as crew breathing air, with further conditioning as needed.

This aircraft example represents a significant use for a compact, light weight permeator capable of operation at varying NEA flow rates and will suggest other similar uses to one skilled in the art. For example, uses in racing vehicles, military tanks and personnel transports and the like can be envisioned. Also, it can be used in an emergency vehicle where the low weight and size and variable flow and/or separation of the invention are desired.

We claim:

1. A method for separating a product gas as either a permeated or non-permeated gas stream from a mixture of said product gas and at least one other gas comprising:
    a. feeding said mixture to a hollow-fiber permeator, said permeator having a plurality of first connecting lines for feeding the gas mixture to a plurality of ports providing fluid communication through an enclosing means to a plurality of first sealed volumes formed by contact of the enclosing means with a tubesheet in which the hollow fibers terminate and a plurality of second connecting lines for feeding a non-permeated gas mixture from a plurality of ports providing fluid communication from a plurality of second sealed volumes formed in the same manner as the plurality of first sealed volumes through enclosing means, each first connecting line corresponding to a second connecting line,
    b. maintaining sufficient pressure differential across the membrane so that a permeated and a non-permeated gas are produced, and
    c. stopping the flow of the feed mixture to certain first sealed volumes when product flow is such that bundle portions defined by the certain sealed volumes are not required to achieve flow and by preventing backflow of non-permeated gas into those bundle portions.

2. The method of claim 1 further comprising sensing needed product gas flow with a sensing means being connected to a valve means in the first connecting lines for actuating said valve means to stop flow to the certain bundle portions when the sensing means determines needed product gas flow can be satisfied by feed to other bundle portions.

3. A method of claim 1 wherein the mixture of said product gas and at least one other gas is air and nitrogen enriched air is the non-permeated gas product.

4. The method of claim 3 further comprising sensing needed nitrogen enriched air flow with a sensing means being connected to a valve means in the first connecting lines for actuating said valve means to stop air flow to the certain bundle portions when the sensing means determines needed nitrogen enriched air flow can be satisfied by feed to other bundle portions.

5. The method of claim 4 wherein the sensing means is a pressure sensing means for determining the difference between pressure above the fuel in the fuel tank and ambient pressure outside the tank.

6. The method of claim 3 wherein the nitrogen enriched air is used to inert fuel tanks on an aircraft.

7. The method of claim 3 wherein the permeated gas is collected as an oxygen enriched air product.

8. A hollow fiber permeator, comprising:
   a. bundle of hollow fibers having open bores in a first tubesheet at a feed end and a second tubesheet at a discharge end;
   b. a first enclosing means at the feed end and a second enclosing means at the discharge end, said enclosing means contacting first tubesheet and second tubesheet in a means that forms a plurality of sealed volumes each containing separate portions of the bores of the hollow fibers at the feed end and at the discharge end, the portions at the feed end corresponding to and in fluid communication with the bores at the discharge end; and
   c. a plurality of ports in each enclosing means, the ports providing fluid communication through each enclosing means.

9. The hollow fiber permeator of claim 8 further comprising a shell enclosing the bundle of hollow fibers and engaging each enclosing means thereby establishing a shell volume surrounding the fibers, the shell volume being separate from the end volumes, and a port in the shell providing fluid communication through the shell.

10. A permeator system for separating one gas from a mixture of said one gas and at least one other gas comprising:
   a. the hollow-fiber permeator of claim 9;
   b. an inlet line feeding the mixture of gases to the permeator;
   c. an outlet line for withdrawal of one permeated gas from port in shell;
   d. the permeator having a plurality of first connecting lines for feeding the gas mixture from the inlet line to the plurality of ports providing fluid communication through the first enclosing means to the plurality of sealed volumes and a plurality of second connecting lines for feeding the gas mixture from the plurality of ports providing fluid communication through the second enclosing means, each first connecting line corresponding a second connecting line; and
   e. at least one said first connecting line having a valve means therein for stopping the flow of feed gas into unused bundle portion and said second connecting lines having a means to prevent backflow of retentate gas into unused bundle portion.

11. The system of claim 10 further comprising a sensing means for determining needed permeated gas flow, said sensing means being connected to said valve means in the first connecting lines for actuating said valve means to stop flow to selected bundle portions when sensing means determines needed permeated gas flow can be satisfied by feed to non-selected bundle portions.

12. The hollow-fiber permeator of claim 8 wherein the portions are concentric with each other.

13. The hollow fiber permeator of claim 12 further comprising an impermeable barrier partially enclosing the hollow fibers of each portion in a manner that creates counter-current flow of permeate on one side of the membrane to flow of feed on the other side of the membrane in that portion, said barrier being sealingly engaged with second tubesheet and closely spaced to but far enough from the first tubesheet to allow adequate flow of permeate.

14. The hollow fiber permeator of claim 13 wherein the barrier is an impermeable film spaced 1 to 3 inches from the first tubesheet.

15. The hollow fiber permeator of claim 12 wherein each enclosing means comprises an adapter attached to the corresponding tubesheet, each adapter having a first seal interposed between each adapter and the surface of the corresponding tubesheet so as to define a first portion of fiber bores within the periphery of the first seal and a second portion outside the periphery of the first seal at each end and so as to define annular volumes in fluid communication with the fiber bores of the first portions and orifices providing fluid communication from the annular volumes through each adapter; each adapter further having a surface perpendicular to the corresponding tubesheet surface, each perpendicular surface having a second seal; end caps positioned over each adapter and its corresponding tubesheet, each end cap having, perpendicular to the corresponding tubesheet, a continuous surface which engages the second seal of each adapter to form first sealed volumes in fluid communication with the first portions, each end cap having an orifice providing fluid communication from the first sealed volumes through each end cap, each end cap further having a continuous surface extending beyond the periphery of the corresponding tubesheet and having seal means to form second sealed volumes in fluid communication with the second portions, each end cap having an orifice providing fluid communication from the second sealed volumes through each end cap.

16. The hollow fiber permeator of claim 12 wherein each portion is separable from the other portions and each portion includes:
   a. a central support structure attached to each tubesheet;
   b. an impermeable barrier at the interface between portions at the tubesheet ends and a seal interposed between the impermeable barrier of one portion and another portion.

17. The hollow-fiber permeator of claim 12 wherein the first and second enclosing means have sealing surfaces that directly contact the hollow fibers so as to form sealed volumes each containing separate portions of the bores of the hollow fibers.

18. The hollow-fibers permeator of claim 17 wherein each portion of fibers extends beyond the adjacent portion so as to form a continuous fiber surface parallel to the fibers for the extended portion at the first and second tubesheets and wherein the first and second enclosing means directly contact the hollow fibers on said extended parallel surface.

19. The hollow fiber permeator of claim 8 further comprising a means to regulate fluid communication attached to each port.

20. The hollow fiber permeator of claim 19 wherein the regulating means are valves.

21. A permeator system for separating one gas from a mixture of said one gas and at least one other gas comprising:
   a. the hollow-fiber permeator of claim 8;
   b. an inlet line feeding the mixture of gases to the permeator;

c. an outlet line for withdrawal of one retentate gas;

d. the permeator having a plurality of first connecting lines for feeding the gas mixture from the inlet line to the plurality of ports providing fluid communication through the first enclosing means to the plurality of sealed volumes and a plurality of second connecting lines for feeding the gas mixture from the plurality of ports providing fluid communication through the second enclosing means to the outlet line, each first connecting line corresponding a second connecting line; and e. at least one said first connecting line having a valve means therein for stopping the flow of feed gas into unused bundle portion and said second connecting lines having a means to prevent backflow of retentate gas into unused bundle portion.

22. The system of claim 21 further comprising a sensing means for determining needed retentate gas flow, said sensing means being connected to said valve means in the first connecting lines for actuating said valve means to stop flow to selected bundle portions when sensing means determines needed retentate gas flow can be satisfied by feed to non-selected bundle portions.

23. A permeator system for providing nitrogen enriched air comprising:

a. the hollow-fiber permeator of claim 8;

b. an inlet line feeding pressurized air to the permeator;

c. an outlet line for withdrawal of nitrogen enriched air;

d. the permeator having a plurality of first connecting lines for feeding the pressurized air from the inlet line to the plurality of ports providing fluid communication through the first enclosing means to the plurality of sealed volumes and a plurality of second connecting lines for feeding the nitrogen enriched air from the plurality of ports providing fluid communication through the second enclosing means to the outlet line, each first connecting line corresponding a second connecting line; and e. at least one said first connecting line having a valve means therein for stopping the flow of pressurized air into unused bundle portion and said second connecting lines having a means to prevent backflow of nitrogen enriched air into unused bundle portion.

24. The system of claim 23 further comprising a sensing means for determining needed nitrogen enriched air flow, said sensing means being connected to said valve means in the first connecting lines for actuating said valve means to stop flow to selected bundle portions when sensing means determines needed nitrogen enriched air flow can be satisfied by feed to non-selected bundle portions.

25. The system of claim 24 wherein the nitrogen enriched air is used to inert fuel tanks on an aircraft.

26. The system of claim 25 wherein the sensing means is a pressure sensing means for determining the difference between pressure above the fuel in the fuel tank and the ambient pressure outside the tank.

* * * * *